US011172043B2

(12) United States Patent
Starsinic et al.

(10) Patent No.: US 11,172,043 B2
(45) Date of Patent: Nov. 9, 2021

(54) MAPPING SERVICE FOR LOCAL CONTENT REDIRECTION

(71) Applicant: Convida Wireless, LLC, Wilmington, DE (US)

(72) Inventors: Michael F. Starsinic, Newtown, PA (US); Qing Li, Princeton Junction, NJ (US); John L. Tomici, Southold, NY (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/272,077

(22) Filed: Feb. 11, 2019

(65) Prior Publication Data

US 2019/0173977 A1    Jun. 6, 2019

Related U.S. Application Data

(63) Continuation of application No. 15/315,904, filed as application No. PCT/US2015/035297 on Jun. 11, 2015, now Pat. No. 10,298,714.

(Continued)

(51) Int. Cl.
*H04W 72/04* (2009.01)
*H04L 29/08* (2006.01)
(Continued)

(52) U.S. Cl.
CPC ......... *H04L 67/2842* (2013.01); *H04W 72/04* (2013.01); *H04W 76/15* (2018.02); *H04W 88/06* (2013.01); *H04W 88/16* (2013.01)

(58) Field of Classification Search
CPC .. H04L 67/2842; H04W 72/04; H04W 76/15; H04W 88/16; H04W 88/06
See application file for complete search history.

(56) References Cited

U.S. PATENT DOCUMENTS 8,566,455 B1 * 10/2013 Zhao ................. H04W 76/10
709/227
8,599,790 B1 * 12/2013 Damle ................ H04W 40/02
370/331
(Continued)

FOREIGN PATENT DOCUMENTS

CN        101111053 A     1/2008
EP         2645777 A1    10/2013
(Continued)

OTHER PUBLICATIONS www.smallcellforum.om, "Urban Small Cell Network Architectures" 088.07.02, Release 7.0, Jun. 14, 51 pages.
(Continued)

*Primary Examiner* — Jay P Patel
(74) *Attorney, Agent, or Firm* — BakerHostetler

(57) ABSTRACT

A mapping service in the mobile core network located after a packet data network gateway examines content requests from user equipment across a first PDN connection to determine if content associated with the content request is cached at an edge server outside of the packet data network. If the content from the packet data network is cached at the edge server, the mapping service redirects the user equipment to request the content from the edge server across a second PDN connection. By using a mapping service located after the packet data network gateway, the content requests may have already passed restrictions such as parental controls.

18 Claims, 12 Drawing Sheets

Related U.S. Application Data

(60) Provisional application No. 62/010,692, filed on Jun. 11, 2014.

(51) Int. Cl.
*H04W 76/15* (2018.01)
*H04W 88/06* (2009.01)
*H04W 88/16* (2009.01)

(56) References Cited

U.S. PATENT DOCUMENTS

| | | | | |
|---|---|---|---|---|
| 9,693,381 | B2* | 6/2017 | Jamadagni | H04W 76/15 |
| 9,775,079 | B2* | 9/2017 | Cheng | H04W 8/082 |
| 10,201,024 | B2* | 2/2019 | Jin | H04W 76/12 |
| 2005/0147077 | A1 | 7/2005 | Erkka | |
| 2010/0262472 | A1* | 10/2010 | Gautam | H04W 12/007 705/14.1 |
| 2011/0103310 | A1* | 5/2011 | Stojanovski | H04L 12/66 370/328 |
| 2011/0219126 | A1* | 9/2011 | Aramoto | H04L 29/1232 709/228 |
| 2011/0299463 | A1* | 12/2011 | Bachmann | H04W 8/065 370/328 |
| 2012/0054809 | A1 | 3/2012 | Chowdhury et al. | |
| 2012/0076121 | A1* | 3/2012 | Choi | H04W 60/005 370/338 |
| 2012/0179790 | A1* | 7/2012 | Kim | H04L 67/22 709/220 |
| 2012/0189016 | A1* | 7/2012 | Bakker | H04W 76/11 370/401 |
| 2012/0191862 | A1 | 7/2012 | Kovvali et al. | |
| 2012/0324100 | A1* | 12/2012 | Tomici | H04W 28/0268 709/224 |
| 2013/0183971 | A1 | 7/2013 | Tamaki et al. | |
| 2013/0322389 | A1 | 12/2013 | Maeda et al. | |
| 2014/0003322 | A1* | 1/2014 | Grinshpun | H04W 36/026 370/312 |
| 2014/0010161 | A1* | 1/2014 | Jeong | H04W 8/18 370/328 |
| 2014/0016553 | A1* | 1/2014 | Nishida | H04W 68/02 370/328 |
| 2014/0071967 | A1* | 3/2014 | Velasco | H04W 4/24 370/338 |
| 2014/0108672 | A1 | 4/2014 | Ou et al. | |
| 2014/0191862 | A1 | 7/2014 | Haines | |
| 2014/0204909 | A1* | 7/2014 | Cheng | H04W 36/0066 370/331 |
| 2014/0219083 | A1* | 8/2014 | Mandyam | H04L 65/80 370/230 |
| 2014/0241317 | A1* | 8/2014 | Jamadagni | H04W 36/28 370/331 |
| 2014/0355508 | A1 | 12/2014 | Anchan et al. | |
| 2014/0355578 | A1* | 12/2014 | Fink | H04L 61/2069 370/338 |
| 2014/0355590 | A1 | 12/2014 | Lim et al. | |
| 2015/0010010 | A1* | 1/2015 | Xie | H04L 45/04 370/401 |
| 2015/0016413 | A1* | 1/2015 | Sirotkin | H04W 12/02 370/331 |
| 2015/0029999 | A1* | 1/2015 | Horn | H04W 76/12 370/331 |
| 2015/0124622 | A1* | 5/2015 | Kovvali | H04L 67/1006 370/236 |
| 2015/0195743 | A1* | 7/2015 | Sirotkin | H04W 36/14 370/235 |
| 2015/0237514 | A1 | 8/2015 | Maeda et al. | |
| 2015/0281966 | A1* | 10/2015 | Griot | H04W 12/06 726/5 |
| 2015/0350954 | A1* | 12/2015 | Faccin | H04W 28/12 370/254 |
| 2015/0358954 | A1* | 12/2015 | Koshimizu | H04W 72/0406 370/329 |
| 2016/0021570 | A1* | 1/2016 | Sirotkin | H04W 36/14 370/235 |
| 2016/0044540 | A1 | 2/2016 | Feng | |
| 2016/0262149 | A1* | 9/2016 | Futaki | H04W 72/12 |
| 2016/0269942 | A1* | 9/2016 | Olsson | H04W 36/14 |
| 2016/0286463 | A1 | 9/2016 | Cheng et al. | |
| 2016/0337919 | A1 | 11/2016 | Bindrim et al. | |
| 2017/0223521 | A1* | 8/2017 | Jeong | H04W 36/12 |
| 2017/0359823 | A1 | 12/2017 | Zaus | |
| 2018/0084594 | A1 | 3/2018 | Lubenski | |

FOREIGN PATENT DOCUMENTS

| | | |
|---|---|---|
| JP | 2005-518167 A | 6/2005 |
| KR | 10-2008-0039623 A | 5/2008 |
| WO | 2011/152377 A1 | 12/2011 |
| WO | 2012/139016 A2 | 10/2012 |
| WO | 2013/038167 A2 | 3/2013 |
| WO | 2013/038168 A2 | 3/2013 |
| WO | 2013/105817 A1 | 7/2013 |
| WO | 2013/143072 A1 | 10/2013 |

OTHER PUBLICATIONS

Nygren et al., "The Akamai Network: A Platform for High-Performance Internet Applications", 44(3), Jul. 2010, 18 pages.

International Patent Application No. PCT/US2015/035297: International Search report and The Written Opinion dated Sep. 14, 2015, 9 pages.

3rd Generation Partnership Project; (3GPP) TS 29.211 V6.4.0, "3rd Generation Partnership Project; Technical Specification Group Core Network and Terminals; Rx Interface and Rx/Gx signalling flows (Release 6)". Jun. 2007, 27 pages.

3rd Generation Partnership Project; (3GPP) TS 24.301 V12.3.0, "3rd Generation Partnership Project; Technical Specification Group Core Network and Terminals; Non-Access-Stratum (NAS) protocol for Evolved Packet System (EPS); Stage 3 (Release 12)", Dec. 2013, 353 pages.

3rd Generation Partnership Project; (3GPP) TS 23.401 V12.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 12)", Dec. 2013, 302 pages.

3GPP TS 22.278, V12.4.0, 3rd Generation Partnership Project: Technical Specification Group Services and System Aspects; Service Requirements for the Evolved Packet System (EPS), (Release 12), Sep. 2013, 15 pages.

\* cited by examiner

MAPPING SERVICE FOR LOCAL CONTENT REDIRECTION

CROSS-REFERENCE TO RELATED APPLICATIONS

This application is a continuation of U.S. patent application Ser. No. 15/315,904, filed Dec. 2, 2016, which is a National Stage of International Application No. PCT/US2015/035297, filed Jun. 11, 2015, which claims the benefit of U.S. Provisional application No. 62/010,692, filed Jun. 11, 2014, the disclosures of which are incorporated herein by reference in their entireties.

BACKGROUND

The 3rd Generation Partnership Project (3GPP) covers cellular telecommunications network technologies, including radio access, the core transport network, and service capabilities. The latest version of the 3GPP mobile core network (MCN) architecture for wireless communications is referred to as the Evolved Packet Core (EPC). The Evolved Packet Core (EPC) has a "flat architecture" to handle the data traffic efficiently from performance and cost perspective. EPC also separates the user data (also known as the user plane) and the signaling (also known as the control plane) to allow the EPC's control and data planes to scale independently.

FIG. 1 is a basic architecture diagram illustrating User Equipment (UE) 104 (e.g., a mobile phone or other wireless device) connectable to a Mobile Core Network (MCN) 102, such as an EPC, and connectable to a local network 128 through a L-GW 130.

In this diagram, the UE 104 connects to a Small Cell Access Point (SC-AP) 106. Small Cell Access Point (SC-AP) 106 is a low-powered radio access node with a range that is small compared to a mobile macrocell. The Small Cell Access Point (SC-AP) 106 can be designed for deployment in small coverage areas such as indoors or for small public hotspots. Small cells include femtocells having a range on the order of 10 meters. In 3GPP, SC-APs include a Home Node B (HNB), which is a 3G femtocell, and a Home eNode B (HeNB), which is an LTE (Long Term Evolution) femtocell.

Security Gateway (SeGW) 108 is shown in the MCN 102. The Security Gateway 108 establishes an IPsec tunnel 110 with the SC-AP 106. Internet Protocol Security (IPsec) is a protocol suite for securing Internet Protocol (IP) communications by authenticating and encrypting each IP packet of a communication session. In tunnel mode, IPsec encrypts the entire IP packet including headers. These encrypted IP packets are then encapsulated into new IP packets with new IP headers. The IPsec tunnel 110 passes through the backhaul 124 which includes intermediate network links between the SC-AP 106 and MCN 102.

The Small Cell Gateway (SC-GW) 112 aggregates traffic from multiple Small Cell Access Points, including SC-AP 106, into the MCN 102. In FIG. 1, the SC-AP 106 is connected using an S1 User (S1-U) interface to the SC-GW 112.

Serving Gateway (S-GW) 114 and Packet Data Network Gateway (PDN-GW) 116 deal with the user plane. They transport IP data traffic between the User Equipment (UE) 104 and external networks, such as Packet Data Network (PDN) 118. The Serving GW 114 is the point of interconnect on the radio side. In this case, the S-GW 114 is connected through the SC-GW 112. Serving Gateway 114 serves the UE 104 by routing incoming and outgoing IP packets. The S-GW 114 is connected to the PDN GW 116.

The PDN GW 116 is the point of interconnect between the MCN 102 and external networks PDN 118. PDN 118 can be an IP network, such as the Internet. The PDN-GW 116 routes packets to and from PDNs, such as PDN 118.

The MME (Mobility Management Entity) 120 deals with the control plane. It handles the signaling related to mobility and security. The MME 120 is responsible for the tracking and the paging of UEs in idle-mode. It is also the termination point of the Non-Access Stratum (NAS) messaging.

The HSS (Home Subscriber Server) 122 is a database that contains user-related and subscriber-related information. It also provides support functions in mobility management, call and session setup, user authentication and access authorization.

The Policy and Charging Rules Function (PCRF) 126 determines policy rules of the network in real time. The PCRF 126 accesses subscriber databases and other specialized functions, such as a charging system, in a centralized manner.

The MCN 102, such as an EPC, can provide Quality of Service (QoS) to users who access content over the Packet Data Network (PDN) 118, such as the Internet. The PDN connection of UE 104 through the MCN 102 can be configured to provide various levels of QoS.

The SC-AP 106 also has the capacity to connect to a local network 128 through a Local Gateway (L-GW) 130. In this way, the User Equipment 104 can use resources at the local network 128, such as office printers, without routing through the MCN 102. The L-GW 130 can be integrated with the SC-AP 106 or be a standalone box.

In R12 of 3GPP, the E-UTRAN/EPC architecture includes a feature called Selected Internet IP Traffic Offload at the Local Network (SIPTO@LN). SIPTO@LN can be used to allow the UE to 104 connect through an L-GW 130 to the Internet. The SIPTO@LN feature allows the MME 120 to direct the UE 104 to break a PDN connection that is currently anchored to P-GW 116 in the MCN 102 and establish a new PDN connection that is anchored to the L-GW 130. The new PDN connection with the L-GW 130 can then be used by the UE 104 to access the Internet. The traffic from the UE 104 is thus offloaded from the backhaul 124 and MCN 102.

Edge caching is discussed in the Small Cell Forum's document SCF088. One example use case describes an Small Cell Network (SCN) deployed in a shopping mall. The SCN offers caching services to content providers. The content provider may offer web accessible advertisements, videos, web pages, etc. The content provider is able to cache content in the SCN, thus providing more efficient (lower latency) access to the user and offloading traffic from the back haul and mobile core network.

In the Small Cell Forum's document SCF088, the Small Cell Forum created a basic architecture framework for supporting edge caching. The framework is shown in FIG. 2.

The architecture of FIG. 2 shows that the caching service consists of four main components—the Edge Server(s) 202, the Local Mapping Service 204, the Management Portal 206 and the Local Data Collection and Analytics Service 208. The edge server(s) 202 are used to store cached content. The local mapping service 204 checks if requests from the UE 210 are available in the local edge server 202 and directs the UE 210 to the cached content. The local mapping service 204 may explicitly redirect the UE 210 to the cached content or transparently forward the UE's request to the edge server 202. In other words, when explicit methods of redirection are used, the UE 210 is aware that it is accessing cached content and when transparent methods of redirection are used, the UE 210 is not aware that it is accessing cached content.

The management portal 206 is used by content providers to load content/data into the edge server(s) 202 of the small cell network. Content placement methods may be transparent or explicit/directed. An explicit method of loading content would be when a content provider intentionally loads content into the edge server for future retrieval. Transparent methods are used when the network autonomously decides to create a cached copy of some remote content.

The management portal 206 may also be used to access the local data collection and analytics service 208. The local data collection and analytics service 208 can be used by the original content provider to manage any content that is cached in the edge servers 202 and to view analytics, or statistics, about how such content is accessed.

With the foregoing as background information, the present application discloses a new method and system for caching content in a mobile core network.

SUMMARY

Embodiments use a mapping service placed in the EPC after the P-GW. When content is loaded into edge servers, the mapping service can be updated with information about what content is available at the edge servers and can be provided with the local IP address or URI of the cached content. The mapping can use an explicit mapping strategy.

By locating the mapping/redirection function after the P-GW, the architecture allows for access policies, such as parental controls, to be enforced by the Mobile Network Operator (MNO). For example, all of the content requests from a UE can be filtered for access policies before these content requests reach the mapping service.

Embodiments also account for the user mobility issues that arise when the user roams into and out of the local network.

In one embodiment, when the UE connects to a small cell access point that can access an L-GW or Local Home Network (LHN) that has access to edge servers, the opportunity to access cached content is detected by the MME. The MME can use a new NAS mobility management message to request that the UE initiate a second PDN connection with the local network. The second PDN connection can be simultaneously maintained with the UE's first PDN connection. The mapping service is allowed to redirect the UE to the second PDN connection when cached content is available. By using a second PDN connection to take advantage of caching opportunities, the user is able to seamlessly transition between a single PDN connection and a dual PDN connection as the UE moves in and out of the local network.

APN-Configuration updates can be used so that the MME is aware of the availability of the edge servers at local networks behind L-GWs.

An alternative architecture can be used where the edge servers reside in a regular (non-local) PDN that is owned by the MNO. The advantage of this architecture is that cached content can be placed in a PDN that is accessible via dedicated P-GW(s), thus offloading P-GW(s) and other EPC nodes that service of other PDN's such as the public internet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

Figure 1:
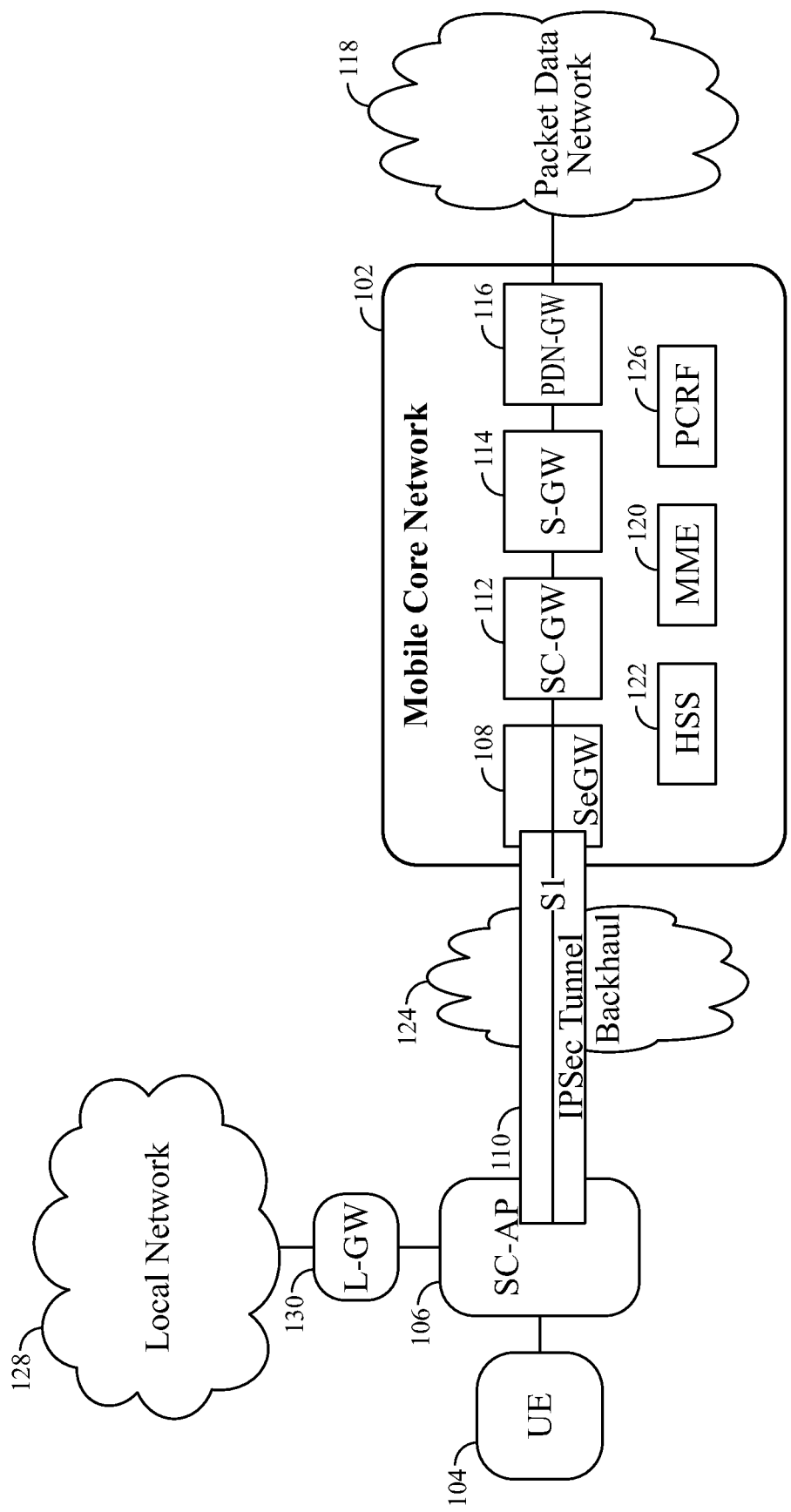
FIG. 1 is a basic architecture diagram illustrating User Equipment connectable to a Mobile Core Network and to a local network.
Figure 2:
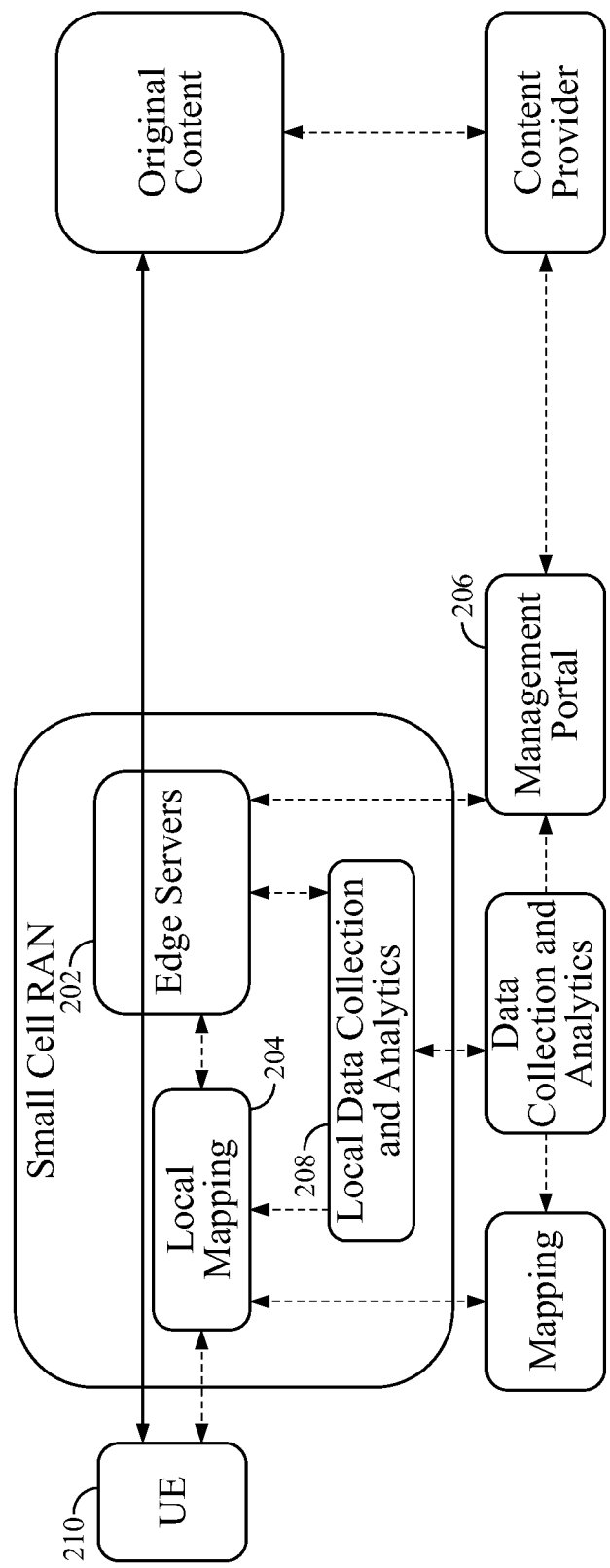
FIG. 2 is a basic architecture diagram illustrating a caching service with a local mapping service.
Figure 3:
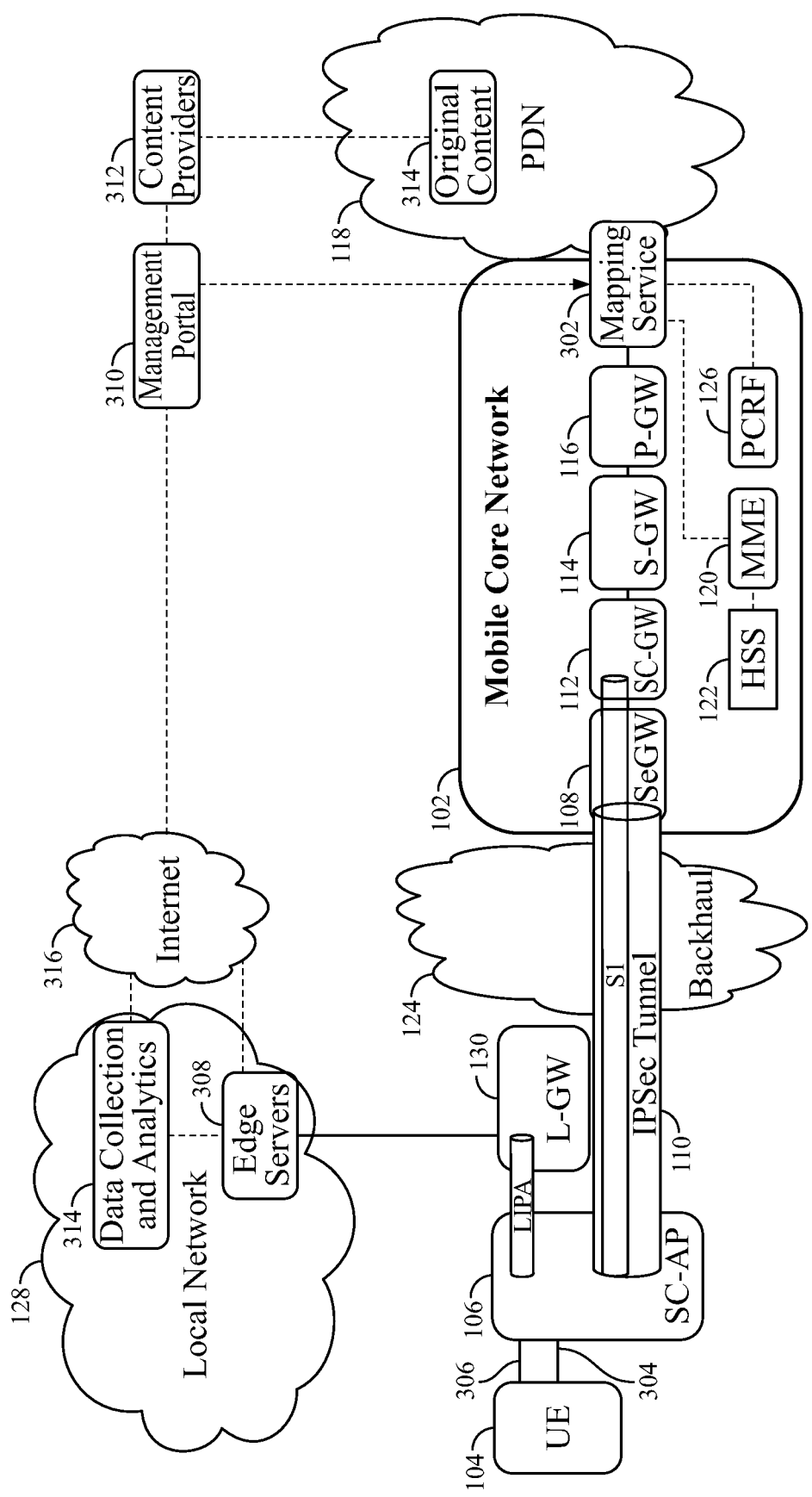
FIG. 3 is a basic architecture diagram illustrating an explicit mapping strategy of one embodiment with a Mapping Service located in the Mobile Core Network after the P-GW.

FIG. 3 is a basic architecture diagram illustrating an explicit mapping strategy of one embodiment with a Mapping Service 302 located in the Mobile Core Network 102 after the P-GW 116. UE 104 has a connection to the PDN 118 via an SC-AP 106, Backhaul 124, and Mobile Core Network (MCN) 102. If the UE 104 has no connection to an L-GW 130 and a local network 128, then the Mapping Service 302 in FIG. 3 may be considered "transparent". In other words, if there is no local connection, then content is retrieved from the PDN 118. When the UE 104 has a connection to the L-GW 130, it may retrieve cached content from the edge servers 308.

In this embodiment, the UE maintains two simultaneous PDN connections 304 and 306. The second PDN connection 306 is used for retrieving cached content. The UE 104 is explicitly directed to the local network 128 by the mapping service 302.

By placing the mapping service 302 after the P-GW 116, the architecture allows for restrictions, such as parental controls, to be applied to UE 104 content requests before decisions are made about redirecting the request.

Before the UE 104 can retrieve content from the Edge Servers 308, the Content Provider 312 loads the Edge Servers 308 with content and the Mapping Service 302 is notified that the cached content is available. UE 104 recognizes that there is an L-GW 130 available to the UE 104 that provides access to the Edge Servers 308. UE 104 also establishes a PDN connection with the L-GW 130. The Mapping Service 302 becomes aware that the UE 104 can access the edge servers 308. When the Mapping Service 302 detects that the UE 104 is accessing content that is available in the Edge Servers 308, the Mapping Service 302 redirects the UE 104 to the content in the Edge Server 308. Alternatively, the P-GW 116 may become aware that the UE 104 can access the Edge Servers 308. The P-GW 116 may then mark IP packets that originate from the UE 104 so that the UE's 104 traffic may be steered to the Mapping Service 302. The P-GW 116 may be notified by the PCRF 126 when the UE 104 has access to edge servers 308 and UE 104 traffic should be redirected, or steered, towards the mapping service.

If the UE 104 moves to a Small Cell that cannot reach the L-GW 130, the UE 104 disconnects its PDN connection with the L-GW 116 and the Mapping Service 302 or P-GW 116 become aware that it can no longer redirect the UE 104.

In one embodiment, the Mobile Network Operator (MNO) can own, operate, and/or have a business relationship with the host of the Edge Servers 308 and Mapping Service 302.

In the example of FIG. 3, a management portal 310 is available to content providers 312. The management portal 310 allows content providers 312 to load content into the edge servers 308 and update the mapping service 302 accordingly. In other words, when content is loaded into the edge servers 308, the management portal 310 notifies the mapping service 302 so that the mapping service 302 is aware of what content is available in each local network. For example, a content provider 312 may want to cache the content of a popular web page called example.com/example-page. The content provider 312 uses the management portal 310 to send the content of example.com/example-page to the edge servers 308. The management portal 310 notifies the mapping service 302 that a cached copy of example.com/example-page is available in the local network 128. The management portal 310 can connect to the edge servers 308 (and data collection and analytics 314) using PDN network 316.

It is understood that the functionality illustrated in FIG. 3, may be implemented in the form of software (i.e., computer-executable instructions) stored in a memory of, and executing on a processor of, a node of an M2M network (e.g., a server, gateway, device, or other computer system), such as one of those illustrated in FIG. 11 or 12 described below.

Figure 4:
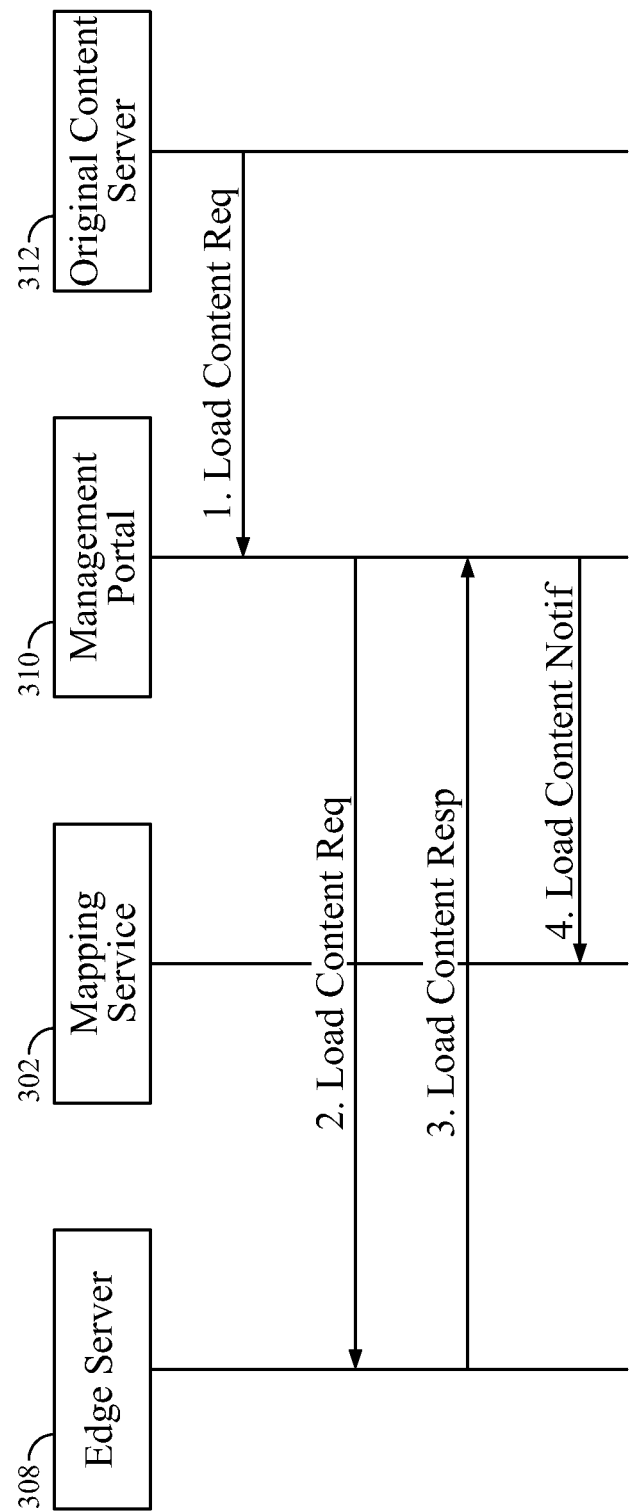
FIG. 4 is a diagram that illustrates loading content into edge servers in one embodiment.

FIG. 4 is a diagram that illustrates loading content into edge servers 308 in one embodiment. The example of FIG. 4 has four steps.

In step 1 of FIG. 4, the content provider 312 sends content to the management portal 310. This message can include the following fields:
 URL of the original content 314
 A copy of the original content.
 The name of the local Access Point Name (APN), L-GW, or LHN-ID, where the content should be cached. An APN identifies a packet data network (PDN). The local APN identifies local network 128 with the edge servers 308.
 Name of the APN(s) that should be associated with this content. This APN identifies PDN 118 that stores the original content 314.

In step 2 of FIG. 4, the management portal 310 sends the content to the edge servers 308 of the local APN(s) that were indicated in step 1.

In step 3 of FIG. 4, the Edge Server 308 responds with a URL of where the cached content can be retrieved.

In step 4 of FIG. 4, the Management Portal 310 sends a notification to the Mapping Server 302 so that it is aware that the cached content is available in a local network 128. This message includes the following fields:
 URL of the original content 314
 URL of the cached content and the local IP Address of the Edge Server.
 The name of the local APN, L-GW, or LHN-ID, where the content should be cached.
 Name of the APN(s) that should be associated with this content.

When the UE 104 performs a Tracking Area Update (TAU), The TRACKING AREA UPDATE REQUEST message to the MME 120 may include a "SIPTO L-GW Transport layer Address" information element or an "LHN-ID" value. The LHN-ID can be provided to MME 120 by the SC-AP 106, such as by a (H)eNB, in every INITIAL UE MESSAGE and every UPLINK NAS TRANSPORT message. The presence of either of these values indicates to the MME 120 that the SC-AP 106 is able to access the L-GW 130.

The MME 120 can determine that the L-GW 130 can access edge servers 308 that hold cached content for a particular APN in different ways. The MME 120 may be provisioned with a list or have access to a database/list that enumerates L-GW's and LHN's that are able to access edge servers and what APN's the edge servers can service. Alternately, the subscribers APN-Configuration can indicate what LHN-ID's and/or L-GW's may be used to access edge servers that are associated with the APN.

The SC-AP 106 may include the public and local IP address(es) of the edge servers 308 via extensions to the INITIAL UE MESSAGE and UPLINK NAS TRANSPORT message. The MME 120 may use the public IP address(es) to determine what local content the UE 104 is able to access and it may use private IP address(es) when redirecting the UE 104.

Thus, when the UE 104 performs the TAU, the MME 120 may detect that the UE 104 is using a Small Cell that has access to an L-GW 130 that can reach edge servers 308 that store cached content. The MME 120 then further checks if the UE's capabilities support connecting to the L-GW 130 and if the UE's current APN connection(s) allow for accessing cached content. If the UE 104 is capable, and permitted, to access the cached content, then the MME 120 commands the UE 104 to establish a connection with the L-GW 130 that can access the edge servers 308.

When the UE 104 receives the new command from the MME 120, it establishes a second PDN connection 306 which it maintains simultaneously with its primary PDN connection 304, which is anchored to the P-GW 116.

The idea of allowing the MME 120 to command the UE 104 to establish a PDN connection is a new concept. In LTE, there is no concept of a network activated PDN connection.

There is an existing procedure whereby the MME 120 may command the UE 104 to perform an "explicit detach with reattach required". This procedure is used when the UE 104 has a SIPTO@LN connection and the UE 104 moves to another SC-AP, such as a H(e)NB, that cannot access the L-GW 130 to which the UE 104 is currently attached. The "explicit detach with reattach required" procedure can be used to command the UE 104 to detach from the L-GW 130 and reattach. When the UE 104 reattaches, the MME 120 selects a P-GW 116 in the MCN 120 for the UE 104.

Embodiments include a modified procedure where the MME 120 detects that the UE 104 has moved to a SC-AP 106 that has access to an L-GW 130 that provides locally cached content. The MME 120 can send a new Non-Access-Stratum (NAS) message to the UE 104 commanding the UE 104 to establish a PDN connection 306 with the L-GW 130.

Figure 11:
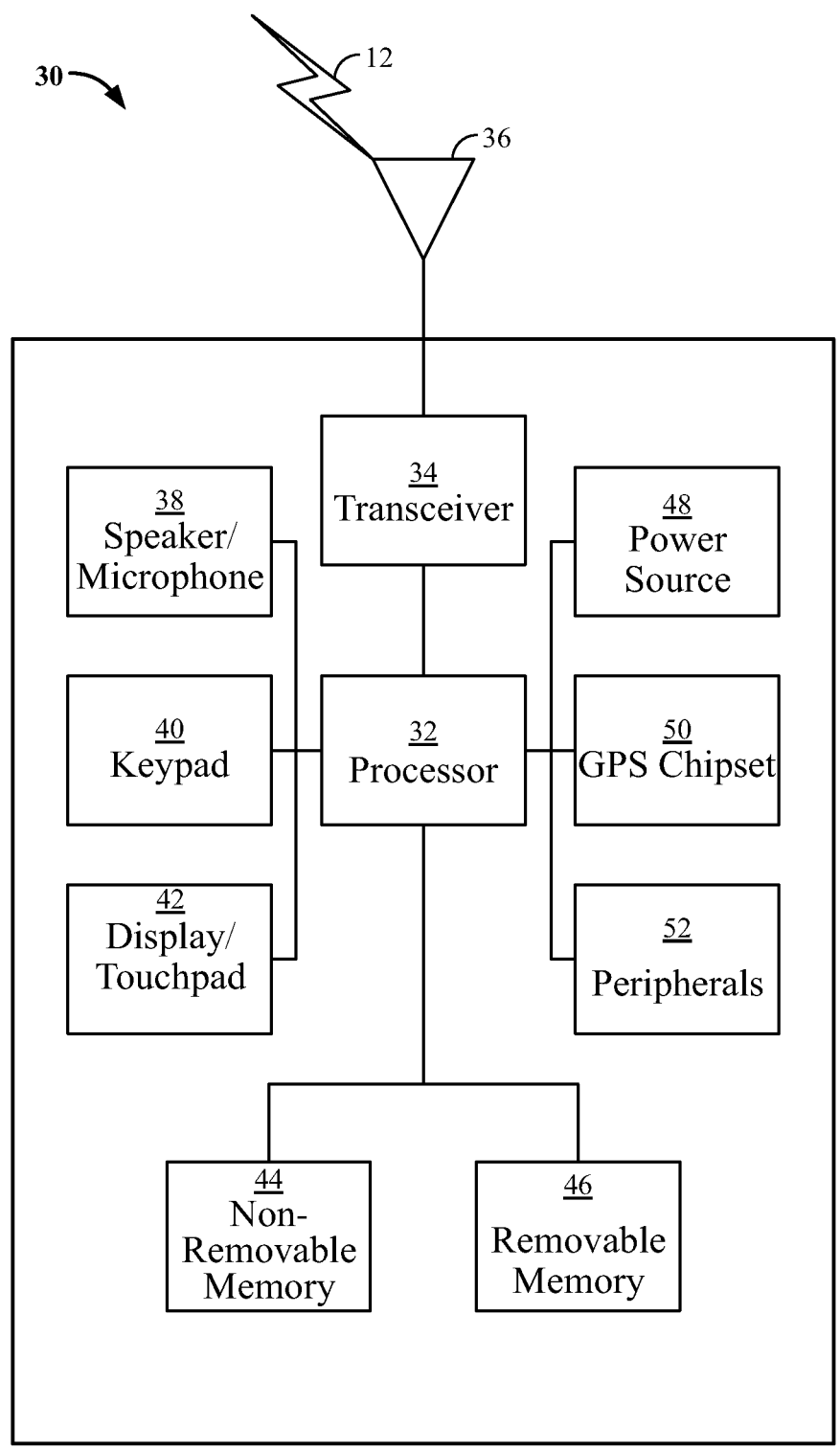
FIG. 11 and FIG. 12 show a block diagram of a computer system or server that may be used to implement any of the core network nodes or end points illustrated in FIGS. 3-9, including any node on which a Mapping Service may be implemented.
Figure 12:
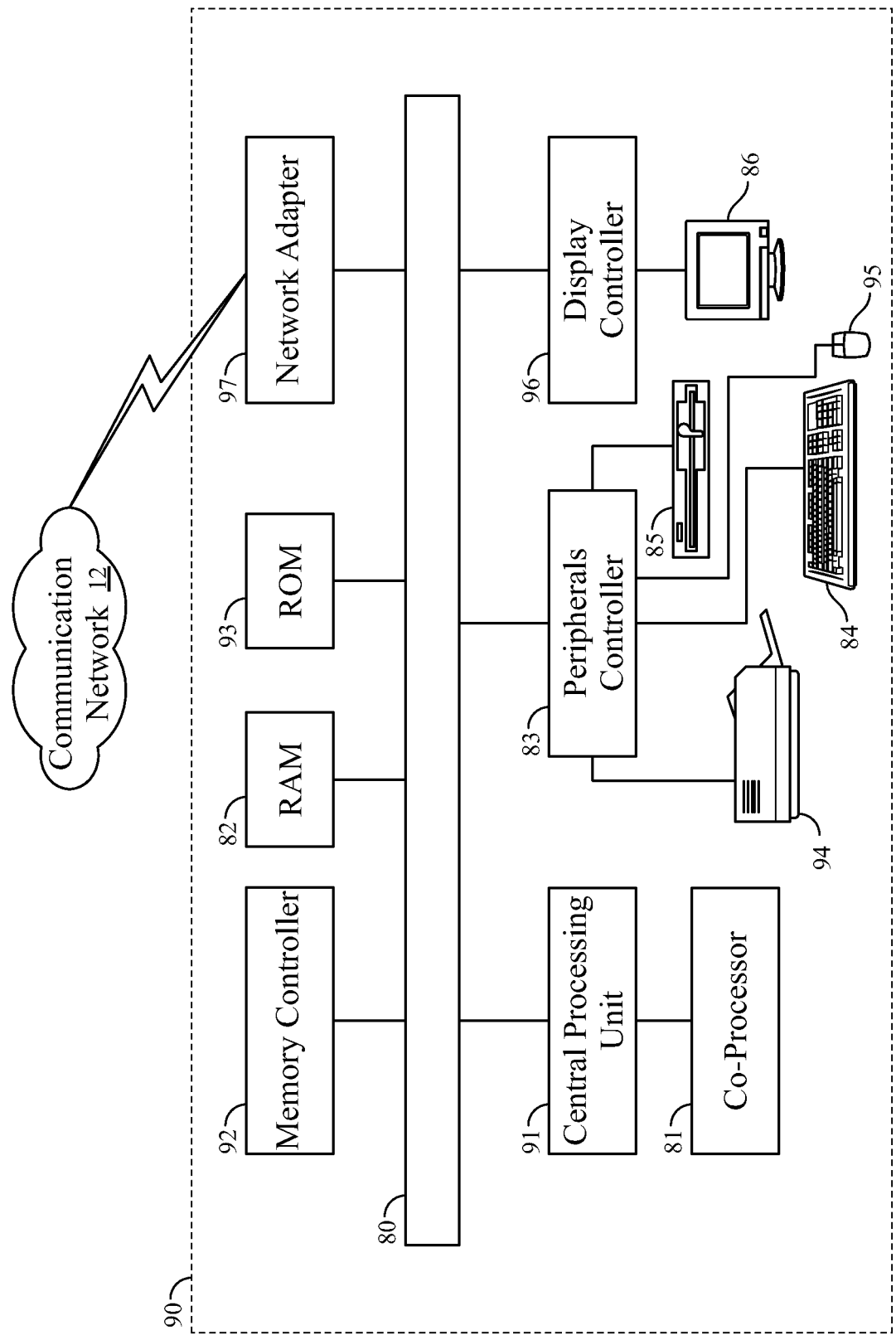

It is understood that the entities performing the steps illustrated in FIG. 4 are logical entities that may be implemented in the form of software (i.e., computer-executable instructions) stored in a memory of, and executing on a processor of, a network node or computer system such as those illustrated in FIG. 11 or FIG. 12. That is, the method(s) illustrated in FIG. 4 may be implemented in the form of software (i.e., computer-executable instructions) stored in a memory of a network node, such as the node or computer system illustrated in FIG. 11 or FIG. 12, which computer executable instructions, when executed by a processor of the node, perform the steps illustrated in FIG. 4. It is also understood that any transmitting and receiving steps illustrated in FIG. 4 may be performed by communication circuitry of the node under control of the processor of the node and the computer-executable instructions (e.g., software) that it executes.

Figure 5:
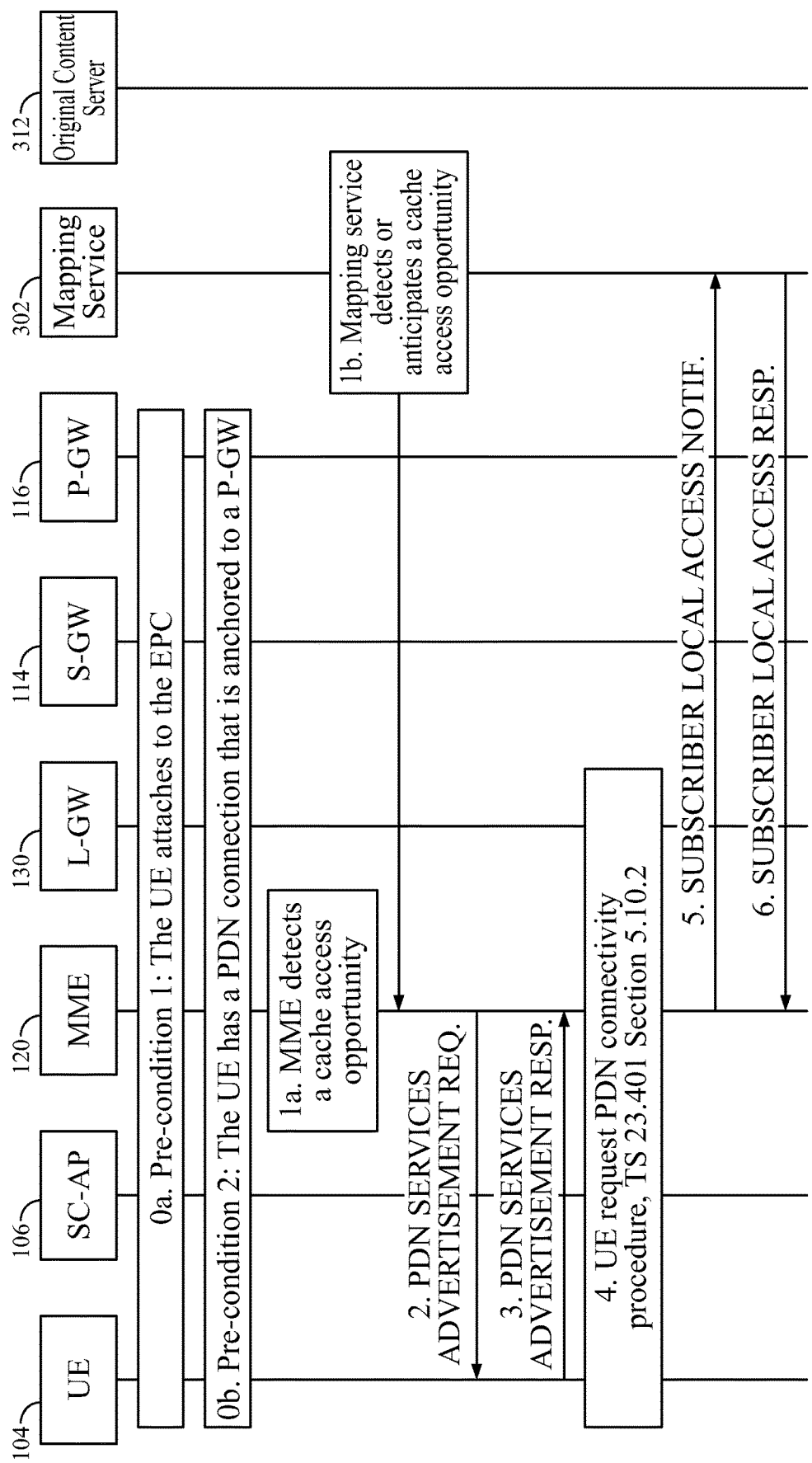
FIG. 5 is a diagram that illustrates a call flow in one where the UE is directed to connect to the L-GW.

FIG. 5 is a diagram that illustrates a call flow in one embodiment where the UE 104 is directed to connect to the L-GW 130. This procedure can be used to solve the mobility issue where the UE 104 moves to an SC-AP 106 that has access to an L-GW 130 that can access cached content.

Steps labeled 0*a* and 0*b* of FIG. 5 are preconditions for the method. For precondition 1 (step 0*a*) of FIG. 5, The UE 104 Attaches to the MCN 102 (EPC). The UE 104 would have used the "E-UTRAN Initial Attach" procedure.

For precondition 2 (step 0*b*) of FIG. 5, the UE 104 establishes a PDN connection 304. The PDN connection 304 is anchored to a P-GW 116 as shown in FIG. 3. The UE 104 would have used the "UE requested PDN connectivity" procedure to establish this connection.

During the "E-UTRAN Initial Attach" procedure, the MME 120 sends the HSS 122 an "Update Location Request" message and the HSS 122 responds with an "Update Location Answer" message. "Update Location Answer" message is used to send the UE's subscription information to the MME 120. This exchange occurs on the S6a interface. The HSS 122 is already provisioned with information about what APN's each UE 104 can connect to. To support this new feature, the HSS 122 is provisioned with additional information for each subscribed APN that supports caching. The updated information indicates if an APN supports local caching and what local networks cache data for the APN. The "Update Location Answer" message carries new information to the MME 120 so that the MME 120 knows which of the UE's APN's allow PDN content to be cached in some local networks. New fields described below are provisioned in the HSS 122 and provided to the MME 120 via the S6a interface.

In step 1 of FIG. 5, based on the UE's location, the MME 120 looks for opportunities to direct the UE 104 to establish a local PDN connection that can be used to retrieve cached content. The new subscription information is used by the MME 120 to decide if there is an opportunity to direct the UE 104 to establish a local PDN connection that can be used to retrieve cached content. In the example of FIG. 5, the MME 120 (or Mapping Service 302) detects that it is possible for the UE 104 to connect to a local PDN, Local Network 128, for accessing cached content.

In one alternative labeled step 1*a* in FIG. 5, the MME 120 Detects a Cache Access Opportunity: During the S1 Application Protocol S1-AP setup procedure, the SC-AP 106 indicates to the MME 120 that an L-GW 130 is accessible to the SC-AP 106 and the SC-AP 106 provides to the MME 120 the identity of the L-GW 130 or LHN-ID that is accessible to the SC-AP 106. The identity is provided in every INITIAL UE MESSAGE and every UPLINK NAS TRANSPORT message. To support this new feature, the SC-AP 106 may indicate to the MME 120 that the L-GW 130 or LHN is cache capable and provide contact information (in the form of an IP address) for its edge servers. The SC-AP 106 may provide this information to the MME 120 as new fields in the INITIAL UE MESSAGE or UPLINK NAS TRANSPORT message. Alternatively, the MME 120 may be provisioned with a list of what L-GW's or LHN-ID's have access to edge servers 308 and the edge server contact addresses, or the MME 120 may have access to a database where this information is stored. When a TAU occurs, the MME 120 checks if there is an L-GW 130 that is accessible to the UE 104 for accessing cached content. If a suitable L-GW 130 is available, the MME 120 further checks if the UE's capabilities (which were obtained from the HSS 122 via the S6a interface) support connecting to the L-GW 130.

In another alternative, labeled step 1*b* in FIG. 5, the Mapping Service 302 detects a cache access opportunity. The Mapping Service 320 or a traffic detection function can detect that the UE 104 is accessing data or anticipate that the UE 104 will access data that is available in the local cache and can send a notification to the MME 120 that a local PDN connection could be established to access the cache. In this case, the mapping service maintains a mapping between the UE's IP address and International mobile Subscriber Identity (IMSI) so that the IMSI can be used to identify the UE 104 when the notification is sent to the MME 120. For example, the Mapping Service 302 may detect that a UE 104 is accessing a news article that is similar to some content that is available in the edge servers. This could cause the Mapping Service 302 to anticipate that the UE 104 may request some content that is available in the edge servers. The Mapping Service 302 uses the UE's IP Address to determine (i.e. lookup) the UE's IMSI and send a notification to the MME 120. The Notification to the MME 120 indicates that UE 104 (identified by an IMSI) could benefit from a PDN connection that provides access to the edge servers 308. Alternatively, the mapping service 302 may communicate with the MME 120 via an inter-working function such as a Services Capability Exposure Function (SCEF). The SCEF may be tasked with resolving the UE's IP Address to an IMSI and determining what MME to send the notification to.

In step 2 of FIG. 5, the MME 120 sends a new "PDN SERVICES ADVERTISEMENT REQ" to the UE 104. The "PDN SERVICES ADVERTISEMENT REQ" is a new EPS Mobility Management message that that is used to indicate to the UE 104 that it should connect to a specific APN in order to access some service. As described in the previous step, the MME 120 knows to send this message because it either detected the cache access opportunity or the mapping service 302 indicated to the MME 120 that there is a cache access opportunity. In this example, this new message is being used in anticipation of the UE 104 being redirected to some cached content in the APN. This message can include the following information elements:

Protocol Discriminator, defined in section 9.2 of the reference, 3GPP TS 24.301, *Non-Access-Stratum (NAS) Protocol for Evolved Packet System (EPS); Stage* 3 *(Release* 12), V12.3.0 (hereafter "reference 3GPP TS 24.301")

Security Header Type, defined in section 9.3.1 of reference 3GPP TS 24.301.

Message Type, defined in section 9.8 of reference 3GPP TS 24.301. One of the EPC Mobility Management Message Type values, such as 0x47, can be reserved for the "PDN SERVICES ADVERTISEMENT REQ" message.

A new "Services Advertisement Type" information element can be used. This information element may be ½ octet in size and it may indicate what type of services is available in the APN. For example, a value of 0x01 may indicate that cached content is accessible in the indicated APN. This field may also useful in the future if the "PDN SERVICES ADVERTISEMENT REQ" message is used to direct the UE 104 to a PDN for some reason other than accessing cached content.

Spare half octet, defined in section 9.9.2.9 of reference 3GPP TS 24.301.

Access Point Name, defined in section 9.9.4.1 of reference 3GPP TS 24.301. The APN name may be a special APN name that is created by the MME 120 so that when the UE 104 tries to establish a PDN connection with the APN the MME 120 is able to easily recognize that the PDN connection should be a with the detected L-GW 130 or LHN. Alternatively, the PDN SERVICES ADVERTISEMENT REQ message could indicate the L-GW 130 or LHN-ID to the UE 104

PDN Type, defined in 9.9.4.10 of reference 3GPP TS 24.301.

Additional Information Elements (IE's) may be included to allow help the UE 104 decide if it should connect to the APN. For example, the message may include pricing information, or more details about what content is available in the APN. Content types may include multimedia, advertisements, web pages, etc. The UE 104 may consider this message to be a suggestion and choose not to establish local PDN connection thus forgoing the opportunity to access cached content.

In step 3 of FIG. 5, the UE sends a new "PDN SERVICES ADVERTISEMENT RESP" to the MME 120. The "PDN SERVICES ADVERTISEMENT RESP" is a new EPS Mobility Management message that that is used to indicate to the MME 120 that the UE 104 received the "PDN SERVICES ADVERTISEMENT REQ" message. This message can include the following information elements:

Protocol Discriminator, defined in section 9.2 of reference 3GPP TS 24.301.

Security Header Type, defined in section 9.3.1 of reference 3GPP TS 24.301.

Message Type, defined in section 9.8 of reference 3GPP TS 24.301. One of the EPC Mobility Management Message Type values, such as 0x48, can be reserved for the "PDN SERVICES ADVERTISEMENT RESP" message. Additional IE's may be included to allow the UE 104 to indicate to the MME 120 if it intends to connect to the APN.

In step 4 of FIG. 5, the UE 104 executes the "UE requested PDN connectivity" procedure that is shown in section 5.10.2 of reference, 3GPP TS 23.401, *General Packet Radio Service (GPRS) enhancements for Evolved Universal Terrestrial Radio Access Network (E-UTRAN) access (Release* 12), *V*12.3.0 (hereinafter "reference 3GPP TS 23.401") The UE 104 executes this procedure because it wants to connect to the local PDN that holds edge servers and cached content. The UE 104 initiates this procedure by sending the "PDN Connectivity Request" message. The "PDN Connectivity Request" indicates that the UE 104 wants to connect to the APN that was provided to the UE 104 in step 2. The "Request Type" IE of the "PDN Connectivity Request" is set to "Initial Request" to indicate that the request is for a new PDN connection. Alternatively, if the UE 104 was provided an L-GW 130 address or LHN-ID by the MME in the "PDN SERVICES ADVERTISEMENT REQ", the UE 104 could provide that value to the MME 120 in the "PDN Connectivity Request".

In Step 5 of FIG. 5, the MME 120 knows what PDN connections are maintained by the UE 104 and when the "UE requested PDN connectivity" procedure is complete, the MME 120 knows that the UE 104 is connected to a local network 128 that can be used to access cached content in the edge servers 308. The MME 120 indicates to the Mapping Service 302 that the UE 104 has access to the local APN, L-GW 130, or LHN. This indication is sent to the Mapping Service 302 by the MME 120 via a new message, SUBSCRIBER LOCAL ACCESS NOTIFICATION, on a new interface. The new interface is between the MME 120 and Mapping Service 302. The mapping service 302 has already been provisioned, via the management portal 310, with information about what content is available in each local APN, L-GW, or in each LHN and the IP Addresses of the edge servers with the cached content that is available in each local network. This new message can carry the following information:

Subscription Identifier for the UE, i.e. IMSI

APN Name/PDN Connection ID—The name of the APN or PDN Connection that can be redirected to local access.

L-GW Address or LHN-ID—The L-GW or LHN that the UE can use to retrieve cached content for the indicated APN/PDN Connection.

If the mapping service 302 is not aware of what content is available via the L-GW 130 that was indicated in the SUBSCRIBER LOCAL ACCESS NOTIFICATION, then the Mapping Service 302 may contact the local network edge servers 308 and data collection and analytics service 314 to learn about what content is cached in the local network 128. This may also be when the mapping service 302 learns how the public IP addresses of original content map to the local IP addresses the edge servers 308 with cached content. This step can be done if the Mapping Service was not updated as described above.

The MME 120 could also optionally provide the mapping service 302 with the public and local IP address(es) of the edge server(s) 308 if this information was provided to the MME 120 by the SC-AP 106.

At the conclusion of this procedure, the UE 104 has two PDN connections; a primary PDN connection 304 that is anchored at the P-GW 116 and a second PDN connection 306 that is anchored to the L-GW 130. The second PDN connection 306 that is anchored to the L-GW 130 can be used to access cached content in the edge servers 308. The Mapping Service 302 is associated with the primary PDN connection 304 and can redirect requests from the primary PDN connection 304 to the second PDN connection 306.

When the UE 104 attempts to use its main PDN connection 304 to access content, the mapping service 302 inspects each request and checks if the URL is available in the local network 128 that the UE 104 has access to. If the URL is available, then the mapping service 302 responds to the request with a redirect response. Alternatively, the message exchange of steps 5 and 6 could occur between the MME 120 and P-GW 116 so that the P-GW will receive an indication that the UE 104 has access to the local APN, L-GW 130, or LHN. The P-GW 116 would then be able to mark packets from the UE 104 so that they can be steered towards the mapping service 302.

It is understood that the entities performing the steps illustrated in FIG. 5 are logical entities that may be implemented in the form of software (i.e., computer-executable instructions) stored in a memory of, and executing on a processor of, a network node or computer system such as those illustrated in FIG. 11 or FIG. 12. That is, the method(s) illustrated in FIG. 5 may be implemented in the form of software (i.e., computer-executable instructions) stored in a memory of a network node, such as the node or computer system illustrated in FIG. 11 or FIG. 12, which computer executable instructions, when executed by a processor of the node, perform the steps illustrated in FIG. 5. It is also understood that any transmitting and receiving steps illustrated in FIG. 4 may be performed by communication circuitry of the node under control of the processor of the node and the computer-executable instructions (e.g., software) that it executes.

Figure 6:
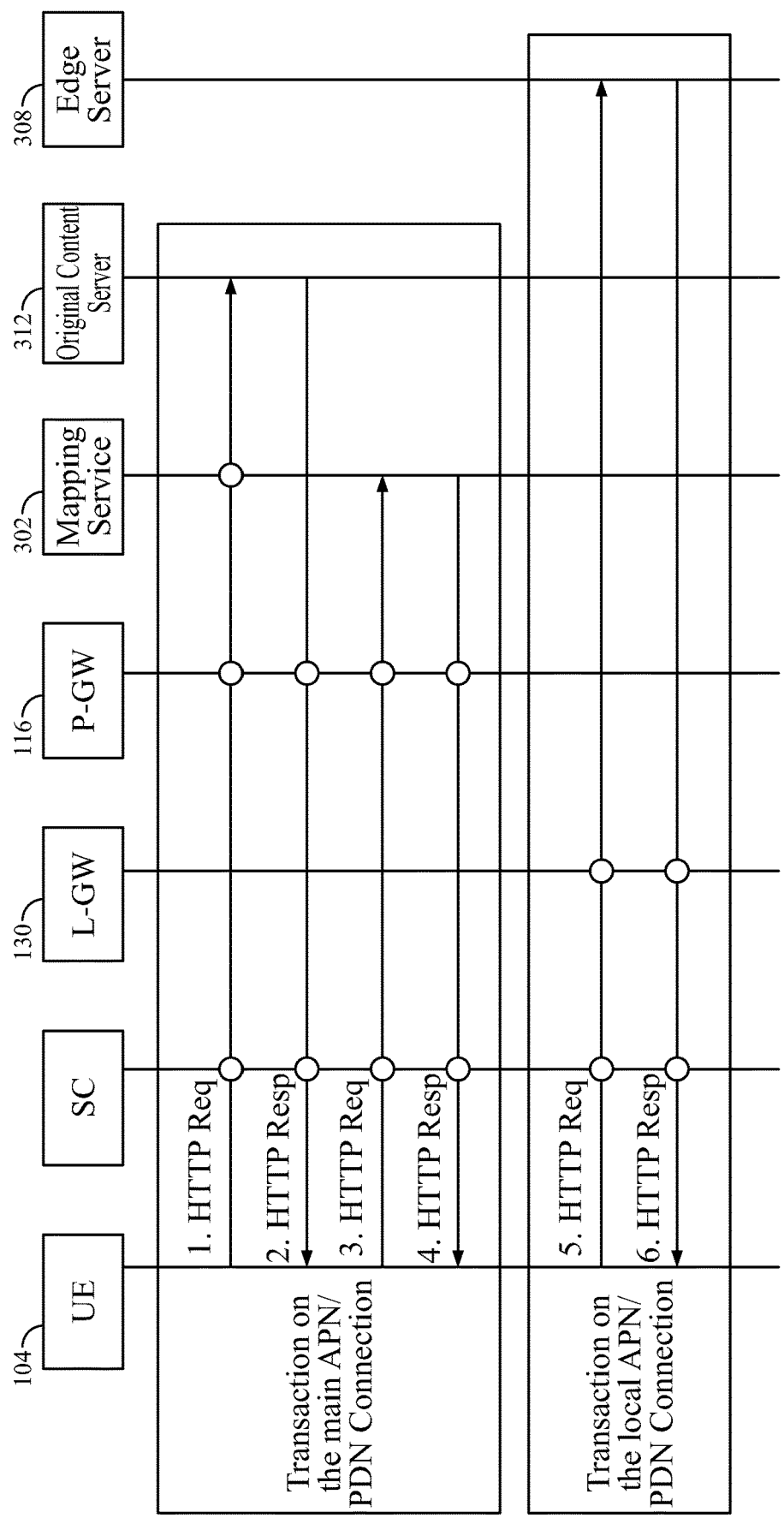
FIG. 6 is a diagram that illustrates an UE retrieving content from an original content server as a result of an initial HTTP request and being redirected to content in an edge server in response to a second request.

FIG. 6 is a diagram that illustrates an UE 104 retrieving content from an original content server 314 as a result of an initial HTTP request in one embodiment. The UE 104 is then redirected to the local cache 308 as a result of an second HTTP request.

In step 1 of FIG. 6, the UE 104 uses its main PDN Connection to make an HTTP request for some content. The request traverses the Small Cell, P-GW 116, and Mapping Service 302. In the example of step 1 of this figure, the mapping service 302 inspects the HTTP request, but finds that there is no cached copy of the requested content available. Since there is no cached content available, the mapping service 302 takes no action (beyond inspecting the request) and the request is allowed to pass to the original content server 314.

In step 2 of FIG. 6, the content server 314 responds with the requested content. The request traverses the Small Cell and P-GW 116. The mapping service 302 does not inspect downlink packets.

In step 3 of FIG. 6, the UE 104 uses its main PDN Connection to make an HTTP request for some content. The request traverses the Small Cell, P-GW 116, and Mapping Service 302. In step 3 of this figure, the mapping service inspects the HTTP request and discovers that there is a cached copy of the requested content in a Local PDN edge server 308 that the UE 104 has access to. Since there is cached content available and the UE 104 has access to the local cache, the mapping service 302 redirects the UE 104 to the local content. This is described in the step 4.

In step 4 of FIG. 6, the Mapping Service issues an HTTP Redirect Response to the UE 104. The redirect response includes the URL of the cached content at the edge servers 308. The URL may include an IP address that belongs to the edge server 308 in the local network or a procedure such as DNS may be used to resolve it to an IP address that belongs to the edge server 308 on the local network 128. The mapping service is after the P-GW 116. Between the P-GW 116 function and Mapping Service 302, the operator may choose to perform traffic detection and functions such as parental controls. If the user is not permitted to retrieve the requested URL, then the request is blocked by the operator and this request is not be seen by the mapping service.

In step 5 of FIG. 6, the UE 104 uses the URL that was received in the redirect response to again request the content. This time, the UE 104 uses its Local PDN connection 306 to make an HTTP request for the cached content at edge server 308. The request traverses the Small Cell and L-GW 130.

In step 6 of FIG. 6, the edge server 308 responds with the requested content. The request traverses the Small Cell and L-GW 130.

The mapping service 302 may use its connection with the management portal 310 or a connection with the edge servers 308 to obtain information about the traffic load in the local network 128 and what level of service can be provided by the local network 128. This information can be used mapping service 302 when determining if the UE 104 should be redirected to the local network 128. The mapping service may also have a connection with the PCRF 126 to obtain the QoS requirements for a given traffic flow. The QoS requirements can be used to help make mapping decisions. The Mapping Service's interface to the PCRF 126 may be based on the Rx interface that is defined in the reference 3GPP TS 29.211, *Rx Interface and Rx/Gx Signaling Flows*. Alternatively, the Mapping Service may communicate with the PCRF 126 via an interface with the SCEF. The SCEF may support an Rx interface with the PCRF 126.

When the UE 104 or MME 120 decides that the UE 104 should no longer maintain the local PDN connection 306, the MME 120 notifies the mapping service 302 so that the Mapping Service 302 knows that it should no longer redirect the UE 104 to local content. The existing UE 104 or MME 120 requested PDN disconnection procedure is used to end the PDN connection 306.

It is understood that the entities performing the steps illustrated in FIG. 6 are logical entities that may be implemented in the form of software (i.e., computer-executable instructions) stored in a memory of, and executing on a processor of, a network node or computer system such as those illustrated in FIG. 11 or FIG. 12. That is, the method(s) illustrated in FIG. 6 may be implemented in the form of software (i.e., computer-executable instructions) stored in a memory of a network node, such as the node or computer system illustrated in FIG. 11 or FIG. 12, which computer executable instructions, when executed by a processor of the node, perform the steps illustrated in FIG. 6. It is also understood that any transmitting and receiving steps illustrated in FIG. 6 may be performed by communication circuitry of the node under control of the processor of the node and the computer-executable instructions (e.g., software) that it executes.

Figure 7:
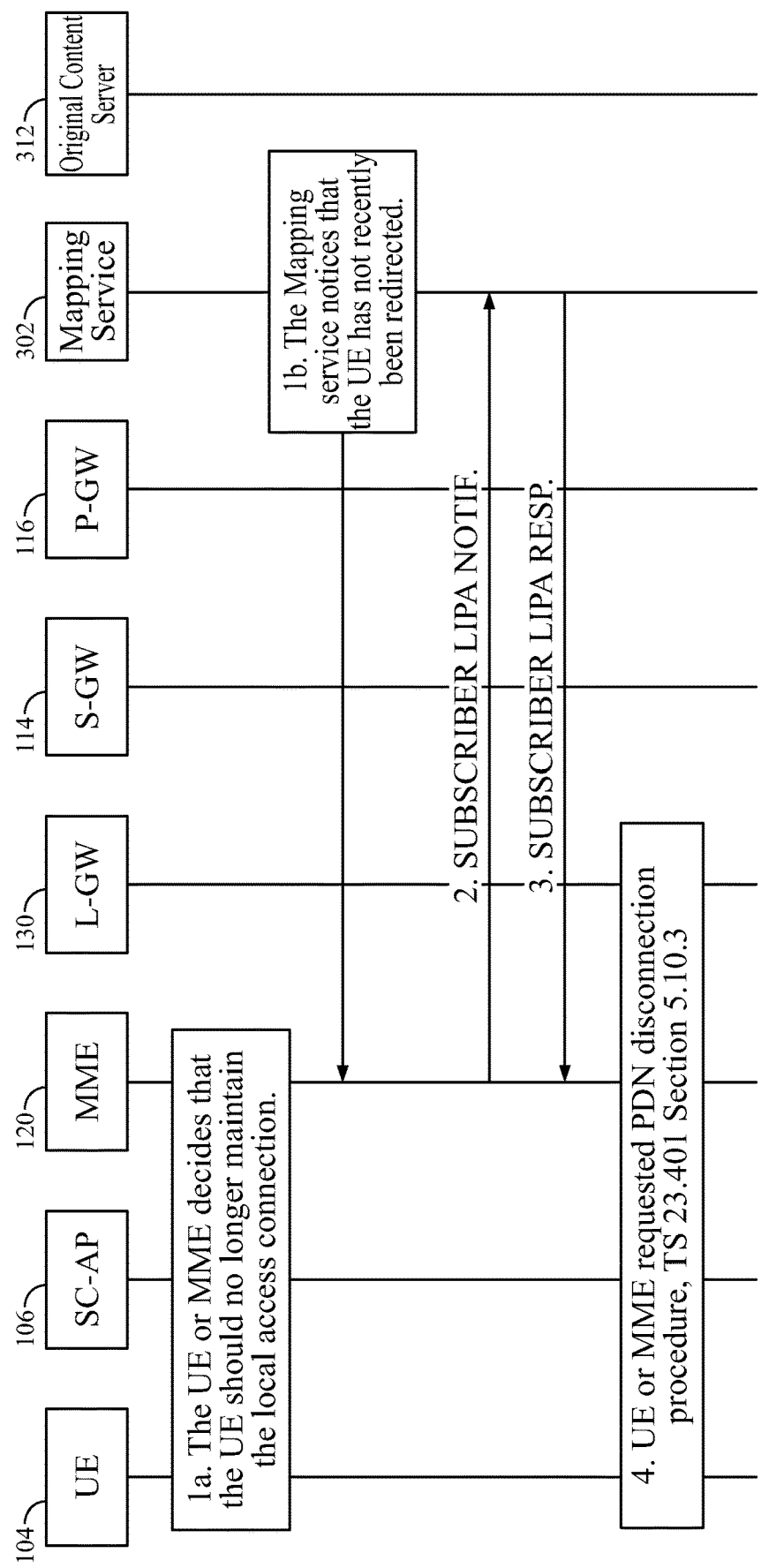
FIG. 7 is a diagram that illustrates to ending a PDN connection when a UE moves to an SC-AP that does not have access to a L-GW.

FIG. 7 is a diagram that illustrates ending a PDN connection 306 when a UE 104 moves to an SC-AP (not shown) that does not have access to a L-GW.

In step 1 of FIG. 7, a decision is made to disconnect the PDN connection 306 that is used to access the local cache at the edge server 308. The UE 104 or MME 120 decides that the UE should no longer maintain the local PDN connection 306. This decision may be triggered by a TAU that indicates that the UE 104 is, or may be, moving to a cell that cannot access the local GW 130. Alternatively, the Mapping Service 302 may decide, or recommend, to the MME 120 that the UE 104 disconnect the local PDN connection. The Mapping Service 302 may decide to do this because the UE 104 has not recently been redirected to the local network and thus has not recently made use of the cache.

In step 2 of FIG. 7, the MME 120 indicates to the Mapping Service 302 that the UE 104 no longer has access to the local network. This indication is sent to the Mapping Service 302 by the MME 120 via a new message, SUBSCRIBER LOCAL ACCESS NOTIFICATION, on a new interface. The new interface is between the MME 120 and Mapping Service 302. This new message may carry the following information:

Subscription Identifier, i.e. IMSI

APN Name/PDN Connection ID—The name of the APN or PDN Connection.

L-GW Address or LHN-ID—The L-GW or LHN that the UE disconnected from.

The message may include the IP address(es) of the edge server(s) that the UE will no longer have access to.

In step 3 of FIG. 7, the Mapping service 302 responds to the MME 120 with an acknowledgement, via the SUBSCRIBER LOCAL ACCESS RESPONSE message.

In step 4 of FIG. 7, the "UE or MME Initiated PDN Disconnection Procedure" is executed as described in in section 5.10.3 of reference 3GPP TS 23.401 to establish this connection.

Exemplary embodiments can include APN Configuration Changes. During the "E-UTRAN Initial Attach" procedure, the MME 120 sends the HSS 122 an "Update Location Request" message and the HSS 122 responds with an "Update Location Answer" message. "Update Location Answer" message is used to send the UE's subscription information to the MME 120. This exchange occurs on the S6a interface. (A similar exchange occurs in UTRAN between the SGSN and HSS on the S6d interface.) "Update Location Answer" includes the APN-Configuration Attribute—Value Pair (AVP). This AVP describes the permitted configuration for each of the UE's subscribed APN's and is defined in 3GPP TS 29.272 section 7.3.35. This AVP is enhanced to support the case where the UE 104 is able to access cached content from an edge server 308 on a local network 128.

For each APN that could have data cached in a local network, the APN-Configuration AVP can carry the following information:

Cached-Access-Permitted. This flag indicates to the MME 120 that, when the UE 104 is connected to this APN, the MME 120 should look for opportunities to direct the UE 104 to connect to a local network that provides cache services to this APN.

SIPTO-Local-Network-Permission. This existing AVP can currently take one of two values; "SIPTO at Local Network ALLOWED" and "SIPTO at Local Network NOTALLOWED". It is proposed that this AVP be allowed to take on a new value called "SIPTO at Local Network CACHED CONTENT ONLY". This value is used to indicate that a SIPTO@LN PDN connection is not allowed to be used for PDN connection. However, a SIPTO@LN PDN connection could be used simultaneously with this PDN connection to retrieve cached content.

L-GW Address(es), LHN-ID(s), or Tracking Area Identity (TAI) Lists that provide access to the cached content.

When the mapping service issues a redirect response, the P-GW 116 may use packet filters, e.g. based on IP source address, IP destination address, source port number, destination port number, etc., to detect that the response is from the mapping service. The P-GW 116 may be configured to not charge the UE 104 for this traffic. In other words, the redirect response might not be included in any downlink bit count that is tallied and send to the Online Charging System (OCS).

As described above, the mapping service 302 can be an HTTP proxy that can redirect the UE 104. Alternatively, the mapping service 302 could be part of the DNS Server. When the UE 104 performs a DNS lookup, the response can be based on whether or not the UE 104 has access to local cache servers. If the UE 104 is looking up a URL that is represented in the local cache, the DNS Server can respond to the UE 104 and redirect it to the local cache.

In this embodiment, the DNS record resolves to two IP address (e.g. one address in the local network and one address in the original content server). The mapping service (DNS Server) determines which IP address should be used to resolve the URL based on whether or not the requestor has access to the edge servers. The procedure where the mapping service (DNS Server) is notified that the requestor has access to the edge server is shown in FIG. 4.

Whether the mapping service 302 is implemented as an HTTP proxy or a DNS server, it can be implemented as a 3GPP Application Function (AF) or Application Server (AS) or TDF with an Rx or Sd interface to the PCRF, an Mh interface to the HSS, and an interface with the MME 120 and/or P-GW 116.

In the architecture of FIG. 3, there are scenarios where a UE 104 could download a web page from the edge servers that includes URLs that link to other web pages. Accessing the links may cause the UE 104 to send a request for content to an original content server on the internet. If the requested content also lives in the local network, then the mapping service may again redirect the UE 104 to cached content. The fact that all original requests for content are routed through the MCN 102 and the Mapping Server 302 is advantageous in the sense that it allows the MCN 102 to record all activity and to enforce user restrictions. However, MCN 102 traffic could be further reduced if the local network was able to modify cached content so that URLs could point to local content.

It is understood that the entities performing the steps illustrated in FIG. 7 are logical entities that may be implemented in the form of software (i.e., computer-executable instructions) stored in a memory of, and executing on a processor of, a network node or computer system such as those illustrated in FIG. 11 or FIG. 12. That is, the method(s) illustrated in FIG. 7 may be implemented in the form of software (i.e., computer-executable instructions) stored in a memory of a network node, such as the node or computer system illustrated in FIG. 11 or FIG. 12, which computer executable instructions, when executed by a processor of the node, perform the steps illustrated in FIG. 7. It is also understood that any transmitting and receiving steps illustrated in FIG. 4 may be performed by communication circuitry of the node under control of the processor of the node and the computer-executable instructions (e.g., software) that it executes.

Figure 8:
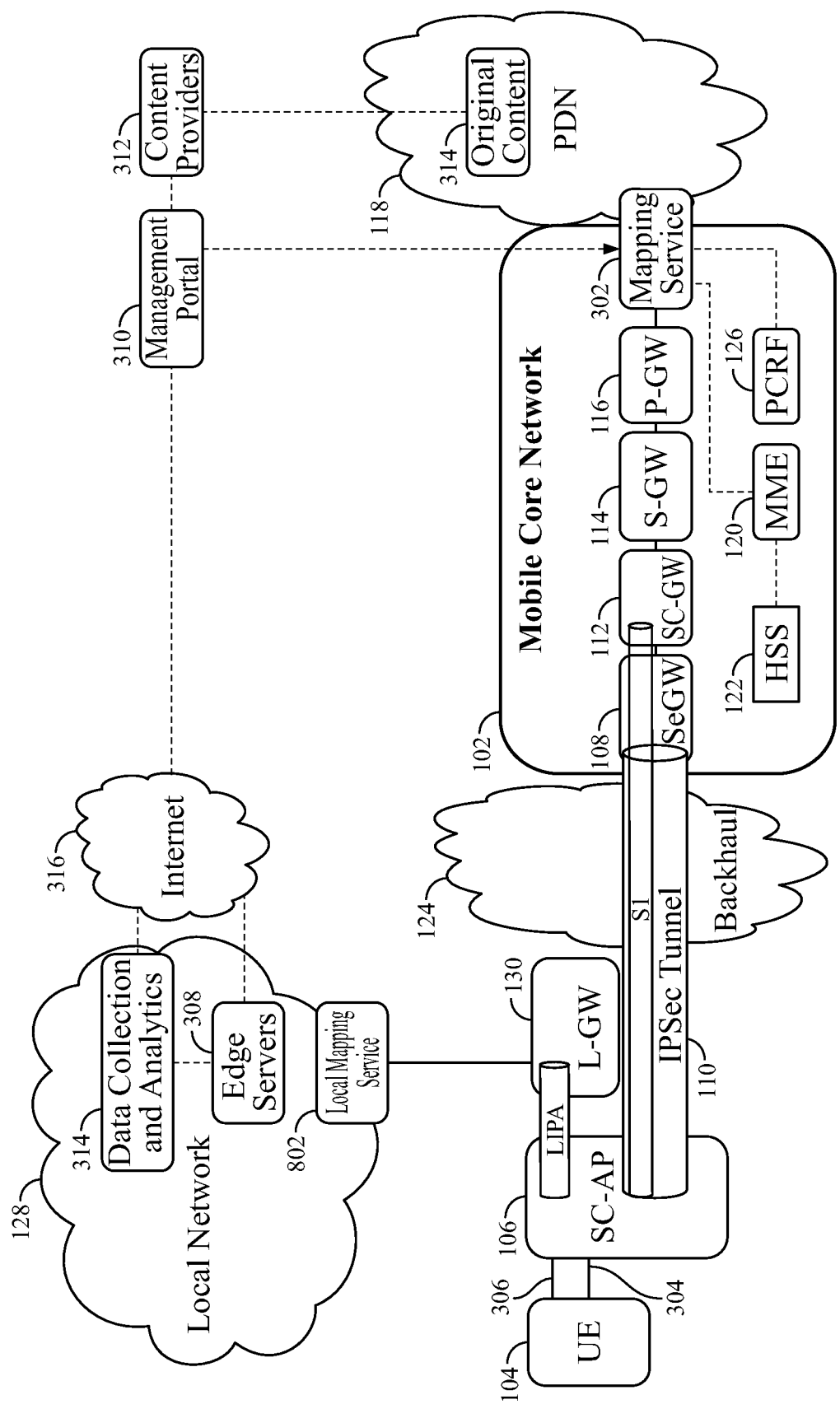
FIG. 8 is a diagram that illustrates an embodiment with a Mapping Service located in the Mobile Core Network after the P-GW and an additional local Mapping Service in the local network.

FIG. 8 is a diagram that illustrates an embodiment with a Mapping Service 302 located in the Mobile Core Network 102 after the P-GW 116 and an additional optional local mapping service 802 is located in the local network 128.

The purpose of the mapping service 302 in the MCN 102 is to map UE requests for content and to redirect the UE 104 accordingly. However, a local mapping service 802 could also be provided in the local network for remapping URLs that are provided to the UE 104. For example, consider the case where a UE 104 downloads a web page from a local edge server 308. The web page may include URLs that point to IP addresses that are in the Internet. However, the content that is pointed to by the URLs may also live in the edge servers 308. When this is the case, the local mapping service may be allowed to modify URLs that are provided to UE 104 so that they map to the cached content in the local network 128.

Note that this local mapping service 802 may be required to access user related policies, such as parental controls, so that the user is prevented from being redirected to content that is not permitted.

It is understood that the functionality illustrated in FIG. 8, may be implemented in the form of software (i.e., computer-executable instructions) stored in a memory of, and executing on a processor of, a node of an M2M network (e.g., a server, gateway, device, or other computer system), such as one of those illustrated in FIG. 11 or 12 described below.

Figure 9:
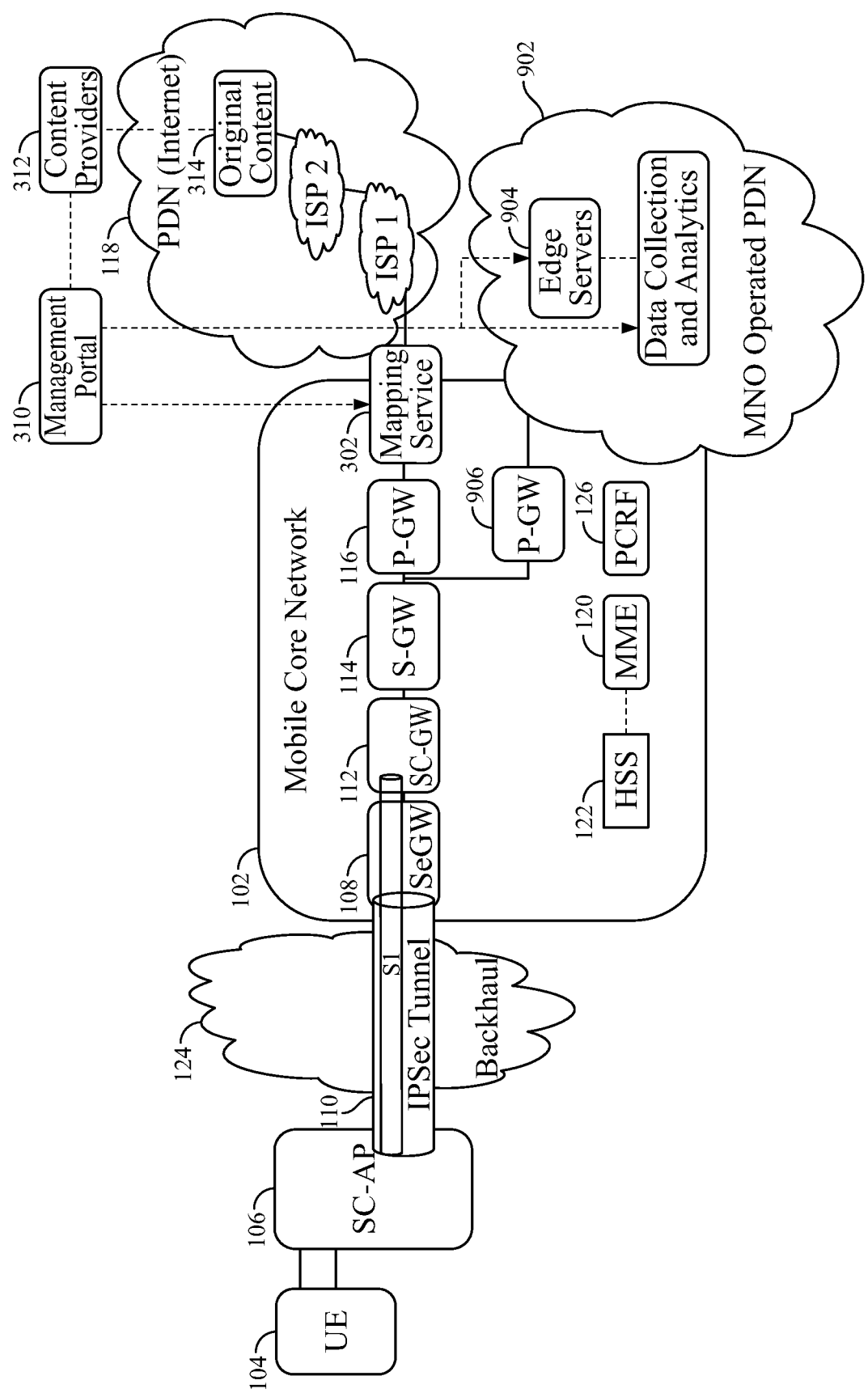
FIG. 9 is a diagram that illustrates an embodiment with a Mapping Service located in the Mobile Core Network after the P-GW and a special PDN that holds the edge servers.

FIG. 9 is a diagram that illustrates an embodiment with a Mapping Service 302 located in the Mobile Core Network 102 after the P-GW and a special PDN 902 that holds the edge servers 904. The edge servers 904 are physically close to the P-GWs 116 and 906 that provide access to the PDN's 118 and 902.

A UE 104 may have a first PDN connection to the "internet" PDN 118. Although the content that the UE 104 access resides in the "internet" PDN 118, it may be very far from the UE 104. Depending on Internet Service Provider (ISP) peering agreements, the content may need to traverse many networks before reaching the MNO's P-GW 116. Thus, it might not be possible for the user to obtain a low latency connection.

A UE 104 may maintain a second PDN connection to the MNO Operated PDN 902 that includes the edge servers 904. When the UE 104 maintains both PDN connections, the mapping service 302 that is associated with the first PDN connection may redirect the UE 104 to the cached content that is stored in edge server 904 of PDN 902.

A deep-packet inspection function such as the mapping service 302, or a traffic detection function, may detect or anticipate that the UE 104 is going to accessing data that is available in the MNO's edge servers 904. Based on the UE's capabilities and the subscriber's permissions, a decision may be made to command, or request, that the UE 104 establish a second PDN connection. The second PDN connection gives the UE 104 access to the edge servers 904.

Steps 2 and 3 of the call flow of FIG. 5 show the MME sending a new PDN SERVICES ADVERTISEMENT REQ message to the UE and the UE responding to the MME with a new PDN SERVICES ADVERTISEMENT RESP message. For FIG. 5, it was proposed that the MME 120 originate this message because the decision to establish the second PDN connection was based largely on the UE's location and the availability of edge servers in the small cell network. In the embodiment of FIG. 9, the decision to establish the second PDN connection is based largely on the result of deep packet inspection that is performed on the output of the P-GW function. Thus, in this section, it is proposed that the P-GW 116 be allowed to send a new PDN SERVICES ADVERTISEMENT REQ message to the UE 104 (via the MME 120 or S-GW 114) and the UE 104 may respond to the P-GW 116 (via the MME 120 or S-GW 114) with a new PDN SERVICES ADVERTISEMENT RESP message. The PDN SERVICES ADVERTISEMENT REQ message from the P-GW 116 indicates the APN that can be used to access the Edge Servers 904 to the UE 104. This new message can be considered a NAS mobility management message. The P-GW 116 may know to send the PDN SERVICES ADVERTISEMENT REQ message based on a message from the Mapping Service 302. The Mapping Service 302 may send the message to the P-GW via an SCEF.

Steps 5 and 6 of the call flow of FIG. 4 show the MME 120 sending a new SUBSCRIBER LOCAL ACCESS NOTIFICATION message to the Mapping Service and the Mapping Service Responding to the MME 120 with a SUBSCRIBER LOCAL ACCESS RESPONSE message. In section 5.1.2, it was proposed that the MME 120 originate this message because it was the entity that coordinated the establishment of the second PDN connection. Thus, in this embodiment, it is proposed that the P-GW 116 (via the MME 120 or S-GW 114) be allowed to send a new LOCAL ACCESS NOTIFICATION message to the Mapping Service 302 and the Mapping Service 302 may respond to the P-GW 116 (via the MME 120 or S-GW 114) with a new PDN SUBSCRIBER LOCAL ACCESS RESPONSE message.

By placing the edge servers 904 in a second PDN 902 that is separate from the first PDN 118, the MNO can architect their MCN 102 such that internet traffic and high volume downloads from the edge servers 904 do not compete for the same MCN resources. For example, the PDN's 118 and 902 do not need to compete for the same P-GW resources.

Compared to the architecture of FIG. 3, the architecture of FIG. 9 has the advantage that the MCN 102 has complete visibility of all UE traffic. Thus, since all traffic traverses the MCN 102, the charging infrastructure of the UE 104 can be completely utilized.

It is understood that the entities performing the steps illustrated in FIG. 9 are logical entities that may be implemented in the form of software (i.e., computer-executable instructions) stored in a memory of, and executing on a processor of, a network node or computer system such as those illustrated in FIG. 11 or FIG. 12. That is, the method(s) illustrated in FIG. 9 may be implemented in the form of software (i.e., computer-executable instructions) stored in a memory of a network node, such as the node or computer system illustrated in FIG. 11 or FIG. 12, which computer executable instructions, when executed by a processor of the node, perform the steps illustrated in FIG. 9. It is also understood that any transmitting and receiving steps illustrated in FIG. 4 may be performed by communication circuitry of the node under control of the processor of the node and the computer-executable instructions (e.g., software) that it executes.

Figure 10:
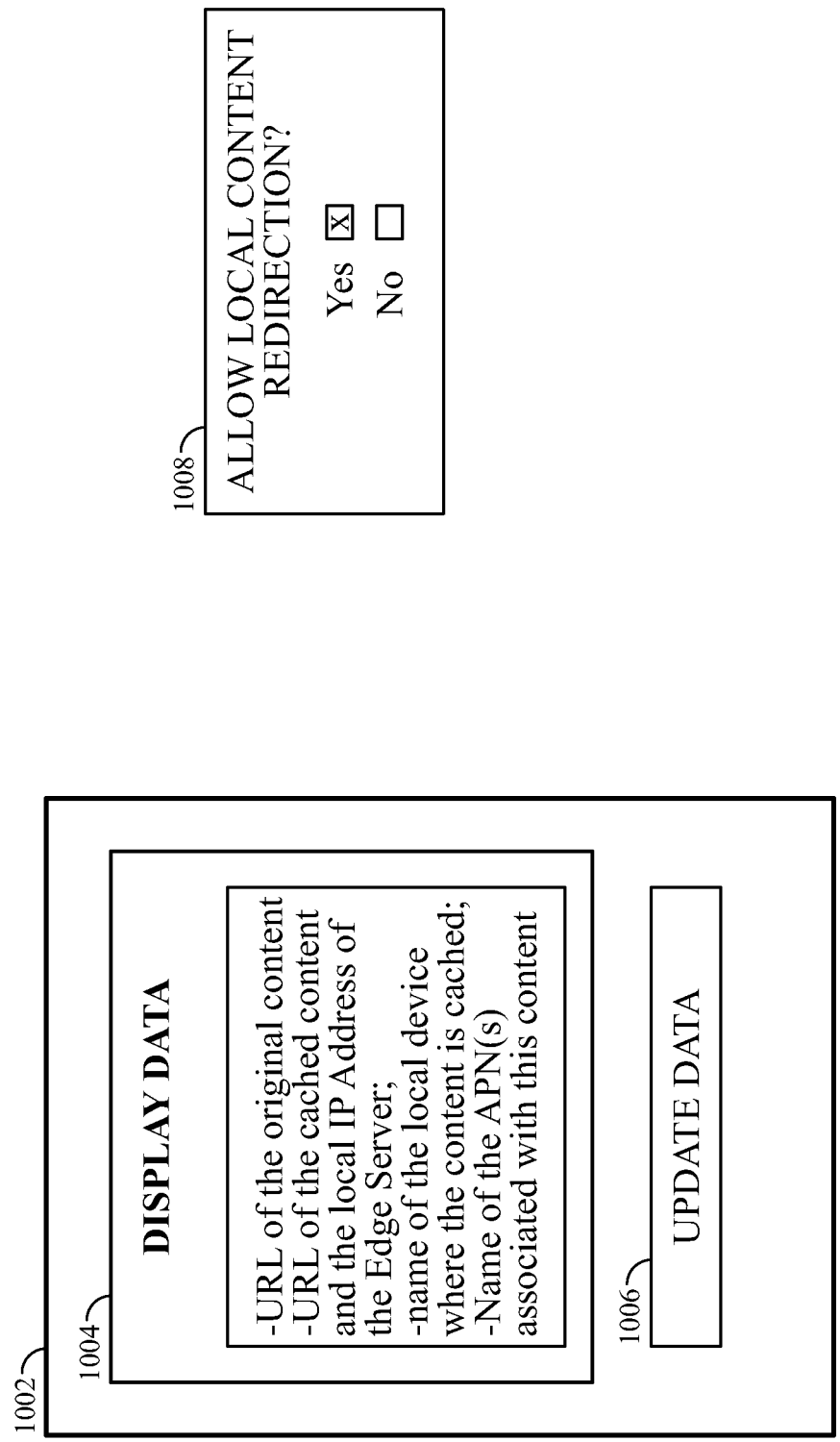
FIG. 10 is a diagram of an example end node, such as an UE.

Interfaces, such as Graphical User Interfaces (GUIs), can be used to assist user to control and/or configure functionalities related to the local content redirection. FIG. 10 is a diagram that illustrates an interface 1002 that allows a user to display data 1004, and update data 1006. For example, the data mentioned above with respect to step 4 of FIG. 4 (URL of the original content 314; URL of the cached content and the local IP Address of the Edge Server; The name of the local device where the content is cached; and Name of the APN(s) that is associated with this content) can be accessed and updated using GUI 1002. The GUI 1002 can allow for searching for such data as well. GUI 1008 can be used to allow a user at a UE to select whether to allow local content redirection, such as during step 2 of FIG. 4.

It is to be understood that interface 1002 and other such interfaces can be produced using displays such as those shown in FIGS. 11 and 12 described below.

FIG. 11 is a diagram of an example node 30 such as a UE (e.g., UEs 104 and 210 in FIGS. 1-3 and 5-9) or other end node device. The end node 30 can be used to implement any of the elements disclosed in this specification including User Equipment 104.

The node 30 can execute or include logical entities such as the mapping service 302, logical entities at the user equipment 104, data collection and analytics 314, edge servers 308 and 904, SC-AP 106, L-GW 130, SeGW 108, SC-GW 112, S-GW 114, P-GW 116, HSS 122, MME 120, PCRF 126, management portal 310, and local mapping service 802 and the logical entities for graphical interfaces such as graphical user interfaces 1002 and 1008. The device 30 can be part of an M2M network or part of a non-M2M network. As shown in FIG. 11, the End node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the Node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC) a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the End node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 11, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 11 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other Nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 11 as a single element, the Node 30 may include any number of transmit/receive elements 36. More specifically, the Node 30 may employ MIMO technology. Thus, in an embodiment, the Node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the Node 30 may have multi-mode capabilities. Thus, the transceiver 34 may include multiple transceivers for enabling the Node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the Node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the Node 30. The power source 48 may be any suitable device for powering the Node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the Node 30. It will be appreciated that the Node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

FIG. 12 is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as the mapping service 302, logical entities at the user equipment 104, data collection and analytics 314, edge servers 308 and 904, SC-AP 106, L-GW 130, SeGW 108, SC-GW 112, S-GW 114, P-GW 116, HSS 122, MME 120, PCRF 126, management portal 310, and local mapping service 802 and the logical entities for graphical interfaces such as graphical user interfaces 1002 and 1008. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as the mapping service 302, logical entities at the user equipment 104, data collection and analytics 314, edge servers 308 and 904, SC-AP 106, L-GW 130, SeGW 108, SC-GW 112, S-GW 114, P-GW 116, HSS 122, MME 120, PCRF 126, management portal 310, and local mapping service 802 and the logical entities for graphical interfaces such as graphical user interfaces 1002 and 1008 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method for a user plane interaction, the method comprising:
   connecting with a first packet data network using a first packet data network connection;
   sending a content request on the first packet data network connection;
   in response to sending the content request on the first packet data network connection, receiving a message comprising information for the user equipment to access data from a second packet data network, wherein the mobile core network generates the message based on the content request from the user equipment after the content request has reached an anchor of the first packet data network connection;
   accessing, using the information and a second packet data network connection, data from the second packet data network; and
   receiving a packet data network service advertisement request message and the message includes an access point name, wherein the packet data network service advertisement request message comprises an indication of one or more of: a security header type, a services advertisement type, or a packet data network type.

2. The method of claim 1, wherein:
   the information comprising at least a URL or an IP Address, or
   the content request is an HTTP content request.

3. The method of claim 1, wherein the data request is associated with a domain name system lookup.

4. The method of claim 1, wherein the anchor of the first packet data network connection comprises a packet data network gateway.

5. The method of claim 1, wherein the data request is associated with a hypertext transfer protocol request.

6. The method of claim 1, wherein the mobile core network determines, based at least on a location of the user equipment and a deep packet inspection of a data request from the user equipment, that the user equipment should connect to the second packet data network using the second packet data network connection in order to access the data.

7. A user equipment in communication with first packet data network using a first packet data network connection, the user equipment comprising a processor and a memory, the memory storing computer-executable instructions which, when executed by the processor, cause the user equipment to perform operations comprising:
   sending a content request on the first packet data network connection;
   in response to sending the content request on the first packet data network connection, receiving a message comprising information for the user equipment to access data from a second packet data network, wherein a mobile core network generates the message based on the content request from the user equipment after the content request has reached an anchor of the first packet data network connection;
   accessing, using the information and a second packet data network connection, data from the second packet data network; and
   receiving a packet data network service advertisement request message and the message includes an access point name, wherein the packet data network service advertisement request message comprises an indication of one or more of: a security header type, a services advertisement type, or a packet data network type.

8. The user equipment of claim 7, further comprising receiving a packet data network service advertisement request message and the message includes an access point name.

9. The user equipment of claim 8, wherein the content request is an HTTP content request.

10. The user equipment of claim 7, wherein the information comprises an internet protocol address.

11. The user equipment of claim 7, wherein the data request is associated with a hypertext transfer protocol request or domain name system lookup.

12. The user equipment of claim 7, wherein the mobile core network determines, based at least on a location of the user equipment and a deep packet inspection of a data request from the user equipment, that the user equipment should connect to the second packet data network using the second packet data network connection in order to access the data.

13. A computer-readable storage medium storing computer-executable instructions which, when executed by a processor of a user equipment in communication with first packet data network using a first packet data network connection, cause the user equipment to perform operations comprising:
   sending a content request on the first packet data network connection;
   in response to sending the content request on the first packet data network connection, receiving a message comprising information for the user equipment to access data from a second packet data network, wherein the mobile core network generates the message based on the content request from the user equipment after the content request has reached an anchor of the first packet data network connection;
   accessing, using the information and a second packet data network connection, data from the second packet data network; and
   receiving a packet data network service advertisement request message and the message includes an access point name, wherein the packet data network service advertisement request message comprises an indication of one or more of: a security header type, a services advertisement type, or a packet data network type.

14. The computer-readable storage medium of claim 13, wherein the content request is an HTTP content request.

15. The computer-readable storage medium of claim 13, wherein the data request is associated with a domain name system lookup.

16. The computer-readable storage medium of claim 13, wherein the data request is associated with a hypertext transfer protocol request.

17. The computer-readable storage medium of claim 13, wherein the mobile core network determines, based at least on a location of the user equipment and a deep packet inspection of a data request from the user equipment, that the user equipment should connect to the second packet data network using the second packet data network connection in order to access the data.

18. The computer-readable storage medium of claim 13, wherein the anchor of the first packet data network connection comprises a packet data network gateway.

* * * * *